United States Patent
Kojima et al.

(10) Patent No.: US 6,971,115 B2
(45) Date of Patent: Nov. 29, 2005

(54) OPTICAL PICKUP APPARATUS

(75) Inventors: Shigeru Kojima, Saitama (JP); Kenji Nakamura, Saitama (JP); Yasuhiro Shinkai, Saitama (JP); Kenji Uchiyama, Saitama (JP); Takashi Shimizu, Saitama (JP)

(73) Assignee: Pioneer Corporation, Tokyo (JP)

( * ) Notice: Subject to any disclaimer, the term of this patent is extended or adjusted under 35 U.S.C. 154(b) by 121 days.

(21) Appl. No.: 10/633,667

(22) Filed: Aug. 5, 2003

(65) Prior Publication Data
US 2004/0027977 A1 Feb. 12, 2004

(30) Foreign Application Priority Data
Aug. 5, 2002 (JP) .......................... P2002-226951

(51) Int. Cl.[7] .......................................... G11B 17/30
(52) U.S. Cl. .................................................... 720/675
(58) Field of Search .............................. 720/674, 675, 720/664, 659, 663, 672, 667

(56) References Cited

U.S. PATENT DOCUMENTS

| | | | | |
|---|---|---|---|---|
| 5,995,479 A | * | 11/1999 | Takizawa et al. | 720/675 |
| 6,052,358 A | * | 4/2000 | Morikawa et al. | 720/663 |
| 6,483,798 B1 | * | 11/2002 | Wu | 720/676 |
| 6,704,270 B2 | * | 3/2004 | Moriyama | 720/675 |
| 6,724,714 B1 | * | 4/2004 | Kato et al. | 720/672 |
| 6,813,773 B2 | * | 11/2004 | Liao et al. | 720/675 |
| 2001/0022772 A1 | * | 9/2001 | Moriyama | 369/249 |
| 2004/0052199 A1 | * | 3/2004 | Nakashima et al. | 369/249 |

* cited by examiner

*Primary Examiner*—William Korzuch
*Assistant Examiner*—Mark Blouin
(74) *Attorney, Agent, or Firm*—Sughrue Mion, PLLC

(57) ABSTRACT

The optical pickup moving mechanism includes: a feed screw and a guide shaft, which are arranged in parallel with each other, for movably supporting an optical pickup; and a drive motor for giving a drive force to the feed screw so that the optical pickup can be moved along a recording medium. The skew adjusting mechanism of the optical pickup for adjusting a skew of the optical pickup adjusts a skew of the optical pickup when the feed screw and the guide shaft are respectively moved and adjusted.

4 Claims, 8 Drawing Sheets

OPTICAL PICKUP APPARATUS

The present disclosure relates to the subject matter contained in Japanese Patent Application No. 2002-226951 filed on Aug. 5, 2002, which is incorporated herein by reference in its entirety.

BACKGROUND OF THE INVENTION

1. Field of the Invention

The present invention relates to an optical pickup apparatus having a skew adjusting mechanism for adjusting a skew of an optical pickup with respect to an information recording face of a recording medium, wherein the optical pickup reads out information recorded on the information recording face and is capable of moving in parallel with the information recording face in the radial direction.

2. Description of the Related Art

Figure 10:
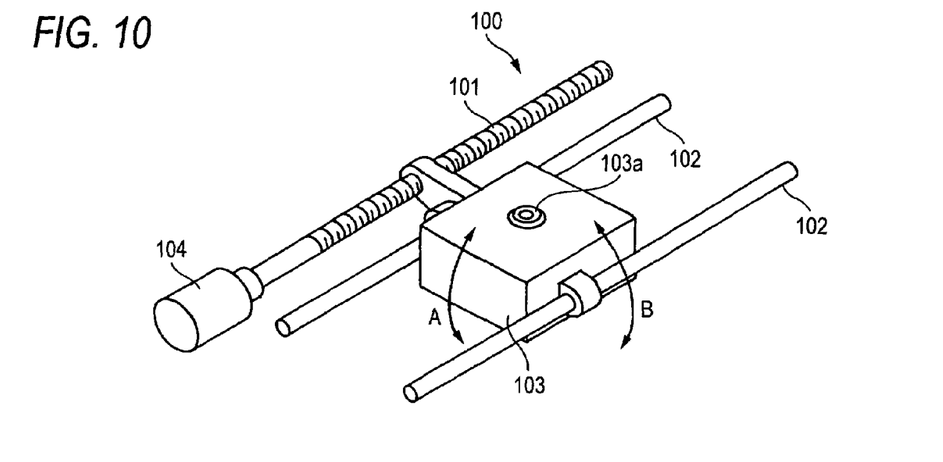
FIG. 10 is a perspective view showing a conventional optical pickup moving mechanism.

As shown in FIG. 10, in a conventional optical pickup moving mechanism 100, a feed screw 101 and a pair of guide shafts 102 are respectively arranged in parallel with each other, and an optical pickup 103 is movably arranged in the feed screw 101 and the guide shafts 102.

At an end portion of the feed screw 101, there is provided a drive motor 104. The feed screw 101 is rotated in the normal and the reverse direction by a drive force generated by the drive motor 104.

When the feed screw 101 is rotated, the optical pickup 103 is moved along the pair of guide shafts 102.

Figure 11:
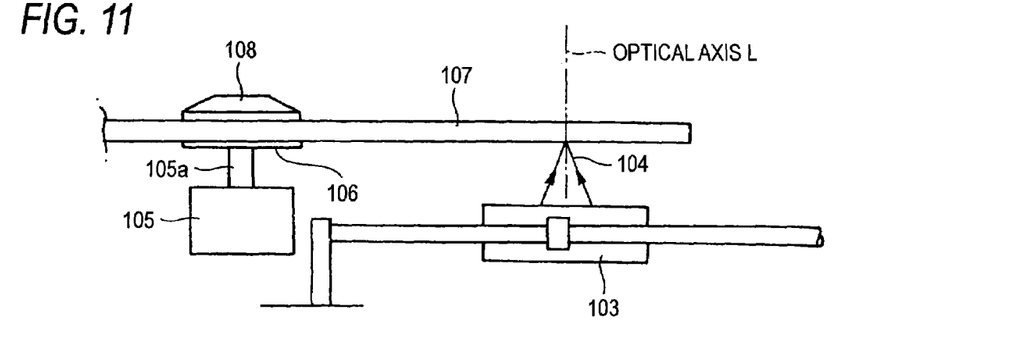
FIG. 11 is aside view showing the conventional moving mechanism.

As shown in FIG. 11, the feed screw 101 (shown in FIG. 10) and the pair of guide shafts 102 are arranged being opposed to an information recording face of the recording medium 107 which is arranged at a predetermined position by a turn table 106 and a damper 108 attached to a rotary shaft 105a of a spindle motor 105. The feed screw 111 and the pair of guide shafts 102 extend in the radial direction of the information recording face.

The optical pickup 103 is moved along in the radial direction of the information recording face of the recording medium 107 by a drive force generated by the drive motor 104 shown in FIG. 10.

The optical pickup 103 includes a light emitting element (laser diode) and a light receiving section (which are not shown in the drawing). The optical pickup 103 also includes and an objective lens 103a arranged being opposed to the information recording face of the recording medium 107. A laser beam emitted from the light emitting element is condensed by the objective lens 103a (shown in FIG. 12) and irradiated onto the information recording face.

When reflected light (returning light) reflected on the information recording face is received via the objective lens 103a by the light receiving section, information recorded on the information recording face can be read out.

That is, the optical pickup 103, which is positioned by the optical pickup moving mechanism 100 so as to face a predetermined position on the information recording face, reads out information recorded on the information recording face by a laser beam irradiated onto the information recording face via the objective lens 103a.

Figure 12:
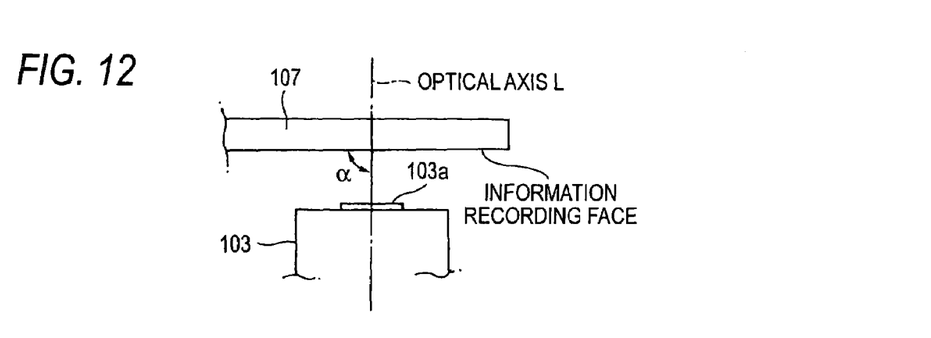
FIG. 12 is a schematic illustration showing a state in which a laser beam is irradiated to a recording medium from the conventional optical pickup.

In order to accurately read out information recorded on the information recording face by the laser beam, it is necessary to adjust an angle α formed between an optical axis L of the objective lens 103a and the information recording face as shown in FIG. 12.

In order to make the light receiving section of the optical pickup 103 accurately receive a beam of reflected light, which has been reflected on the information recording face, it is necessary for the beam of reflected light to be guided into the light receiving section without decreasing a quantity of light reflected on the information recording face. Therefore, it is required that a skew of the optical pickup 103 (of the objective lens 103a) with respect to the information recording face is adjusted.

Especially, in the case of an optical recording medium of high-density type such as DVD (Digital Versatile Disc), recording pits are formed on the disc in a highly dense state. Therefore, the skew of the optical pickup 103 needs to be adjusted accurately.

In the above conventional optical pickup moving mechanism 100, a skew adjustment of the optical pickup. 103 is made by moving and adjusting a pair of guide shafts 102 shown in FIG. 10.

In the case of adjusting the skew of the optical pickup 103 in the radial direction (direction indicated by arrow A in FIG. 10) of the optical axis L of the objective lens 103a, the guide shafts 102 are simultaneously moved so as to be adjusted. In the case of adjusting the skew of the optical pickup 103 in the tangential direction (direction indicated by arrow B in FIG. 10) of the optical axis L of the objective lens 103a, the guide shafts 102 are respectively and independently moved so as to be adjusted.

However, in the skew adjustment of the conventional optical pickup 103, only the pair of guide shafts 102 are moved and adjusted, and the feed screw 101 is fixed to a fixing member such as a chassis so that the feed screw 101 cannot be moved.

Therefore, after the skew of the optical pickup 103 has been adjusted (after the pair of guide shafts 102 have been moved and adjusted), a minute misalignment is caused in the parallelism between the feed screw 101 and the pair of guide shafts 102. When the optical pickup 103 is moved in the radial direction of the information recording face, there is a possibility that an excessive load is given to the feed screw 101 and the drive motor 104.

SUMMARY OF THE INVENTION

It is therefore an object of the invention to provide an optical pickup apparatus having a skew adjusting mechanism in which the occurrence of an excessive load to an optical pickup moving mechanism that moves the optical pickup in a radial direction of an information recording face of a recording medium is prevented.

In order to achieve the above object, according to one aspect of the invention, there is provided an optical pickup apparatus including: an optical pickup adapted to irradiate a light on an information recording face of a recording medium and to read out information recorded on the information recording face; a feed screw adapted to move the optical pickup in a radial direction of the recording medium; a guide shaft arranged to be in parallel with the feed screw and adapted to support and guide a movement of the optical pickup; a drive motor adapted to drive the feed screw so as to move the optical pickup along the guide shaft; a skew adjusting mechanism adapted to move each of the feed screw and the guide shaft so as to adjust a skew of the optical with respect to the information recording face of the recording medium.

According to the aspect of the invention, both the feed screw and the guide shaft can be moved. When they are moved and adjusted, it becomes possible to adjust a skew of the optical pickup.

Accordingly, there is no possibility that a minute misalignment of the parallelism between the feed screw and the guide shaft is caused after the skew of the optical pickup has been adjusted.

Therefore, it is possible to prevent the feed screw and the drive motor from being given an excessive load.

Further, when the drive motor is moved in the case of moving the feed screw for adjustment, it is possible to prevent the occurrence of a misalignment of the position between a gear to be driven of the feed screw and a drive gear arranged on a rotary shaft of the drive motor.

BRIEF DESCRIPTION OF THE DRAWINGS

The above objects and advantages of the present invention will become more apparent by describing a preferred exemplary embodiment thereof in detail with reference to the accompanying drawings, wherein.

DETAILED DESCRIPTION OF THE PREFERRED EMBODIMENTS

Referring to FIGS. 1 through 8, a description will be given in detail of a preferred embodiment of the invention.

An optical pickup moving mechanism of the embodiment will be explained below by referring to FIGS. 1 and 2.

Figure 1:
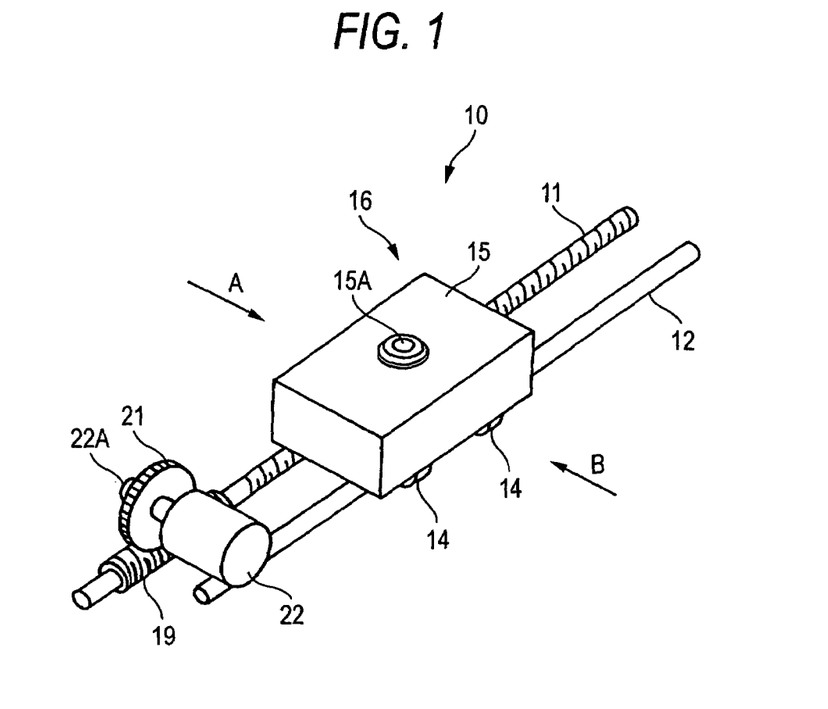
FIG. 1 is a perspective view showing an optical pickup moving mechanism provided with a skew adjusting mechanism of an optical pickup of the invention.

As shown in FIG. 1, an optical pickup moving mechanism 10 includes: an optical pickup 15 for reading out information recorded on an information recording face of a recording medium 30 (shown in FIG. 2); a feed screw 11; a guide shaft 12; and a drive motor 22 which moves the optical pickup 15 along the guide shaft 12.

Inside the optical pickup 15, there is provided a light emitting element (laser diode) not shown in the drawing. A laser beam emitted from the light emitting element is condensed onto the information recording face by an objective lens 15A, which is exposed from an upper face of the optical pickup 15 being opposed to the information recording face.

Inside the optical pickup 15, there is also provided a light receiving section for receiving light (returning light) reflected on the information recording face and for photoelectrically converting the received light into an electric signal. On a lower face of the optical pickup 15, there are provided two L-shaped guide support members 14, which are protruded from the lower face of the optical pickup 15, for supporting the guide shaft 12, wherein the L-shaped guide support members 14 are arranged at a predetermined interval.

Figure 2:
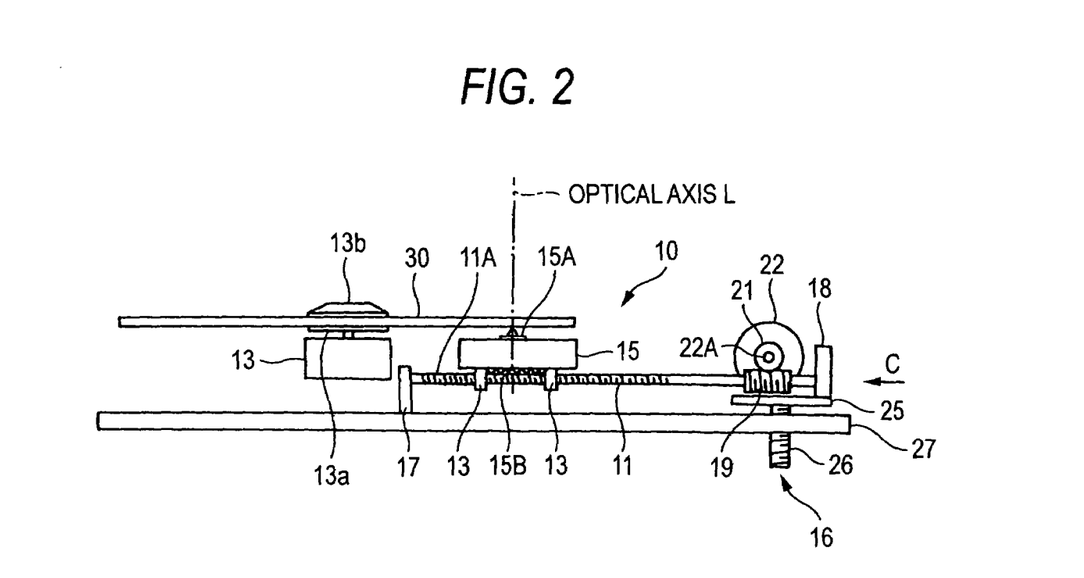
FIG. 2 is a view taken in the direction of arrow A in FIG. 1.

As shown in FIG. 2, on the opposite side to the guide support member 14 on the lower face of the optical pickup 15, there are provided two feed screw support members 13, which are protruded from the lower face, having an insertion hole into which the feed screw 11 is inserted, wherein the feed screw support members 13 are arranged at a predetermined interval.

Between the feed screw support members 13 arranged on the lower face of the optical pickup 15, there is provided a rack 15B (shown in FIG. 2) that gears with a screw member formed on the feed screw 11.

The optical pickup 15 is supported at four points including the guide support members 14 and the feed screw support members 13 on the feed screw 11 and the guide shaft 12.

In a portion close to an end portion of the feed screw 11, the drive motor 22 is provided. A drive gear 21 is attached to a rotary shaft of the drive motor 22. The drive gear 21 gears with a gear member 19 to be driven that formed at an end portion of the feed screw 11.

The guide shaft 12 and the feed screw 11 are arranged in parallel with each other. As shown in FIG. 2, the guide shaft 12 and the feed screw 11 extend along in the radial direction of the information recording face of the recording medium 30 attached at a predetermined position by a turn table 50a and a damper 50b which are attached to a rotary shaft of a spindle motor 50.

The guide shaft 12 and the feed screw 11 are arranged being opposed to the information recording face.

The optical pickup moving mechanism 10 structured as described above moves the optical pickup 15 when a drive force generated by the drive motor 22 is transmitted to the gear member 19 to be driven of the feed screw 11 via the drive gear 21.

The feed screw 11 which is given the drive force from the drive motor 22 is rotated in the normal and the reverse direction, and the optical pickup 15 is moved being driven along the guide shaft 12, that is, along the information recording face of the recording medium 30.

Hereinafter, referring to FIGS. 2 through 5, explanations will be made on a skew adjusting mechanism 16 for adjusting a skew of the optical pickup 15 in the above optical pickup moving mechanism 10. The skew adjusting mechanism 16 includes: a support member 17 for supporting an end portion 11A, which will be referred to as "one end" hereinafter, of the feed screw 11 located on an inner circumferential side of the information recording face of the recording medium 30; a support member 18 for supporting an end portion 11B, which will be referred to as "the other end" hereinafter, of the feed screw 11 located on the outer circumferential side of the information recording face of the recording medium 30; an elastic support member 38 for supporting an end portion 12A, which will be referred to as "one end of the guide shaft" hereinafter, of the guide shaft 12 located on the inner circumferential side of the information recording face of the recording medium 30; an elastic support member 39 for supporting an end portion 12B, which will be referred to as "the other end of the guide shaft" hereinafter, of the guide shaft 12 located on the outer circumferential side of the information recording face of the recording medium 30; and an elastic support member 25.for supporting the support member 18 and the drive motor 22.

Figure 3:
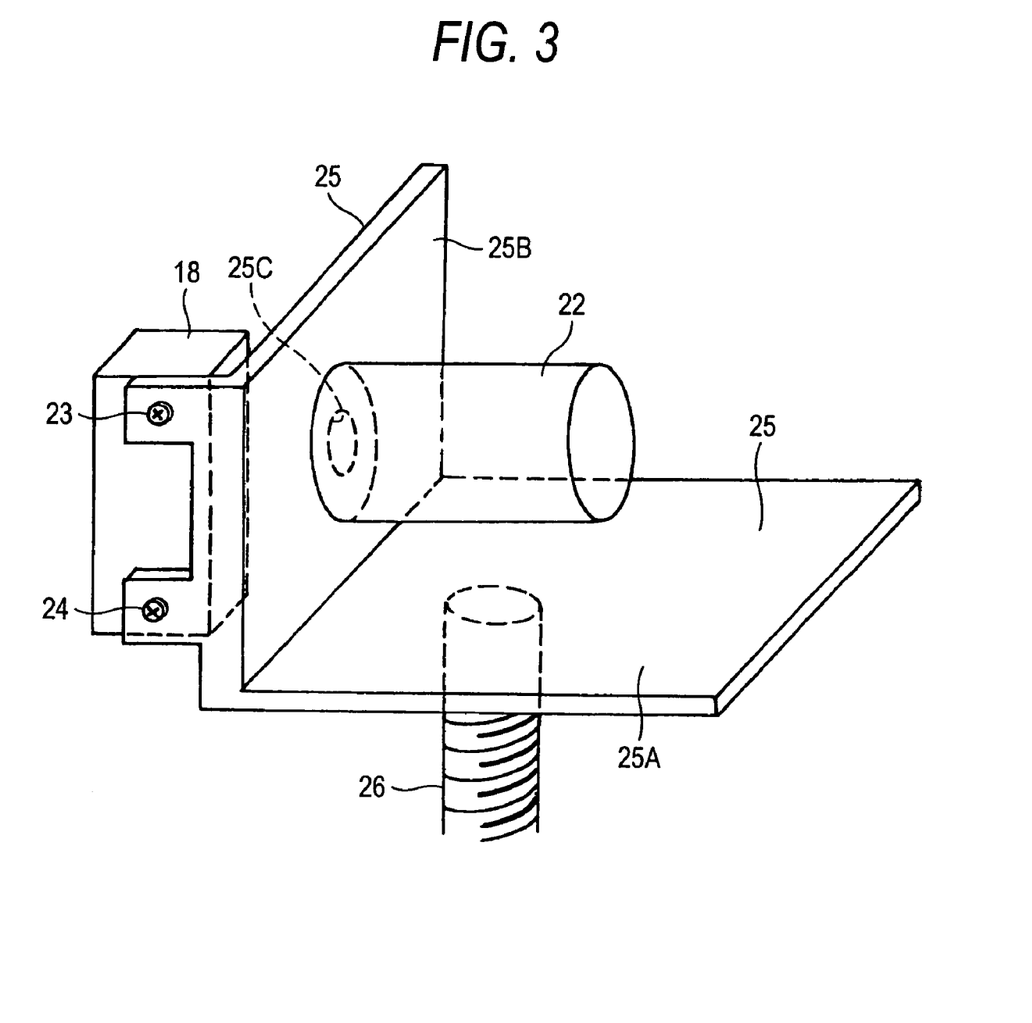
FIG. 3 is a perspective view showing a primary portion of the optical pickup moving mechanism provided with the skew adjusting mechanism.
Figure 4:
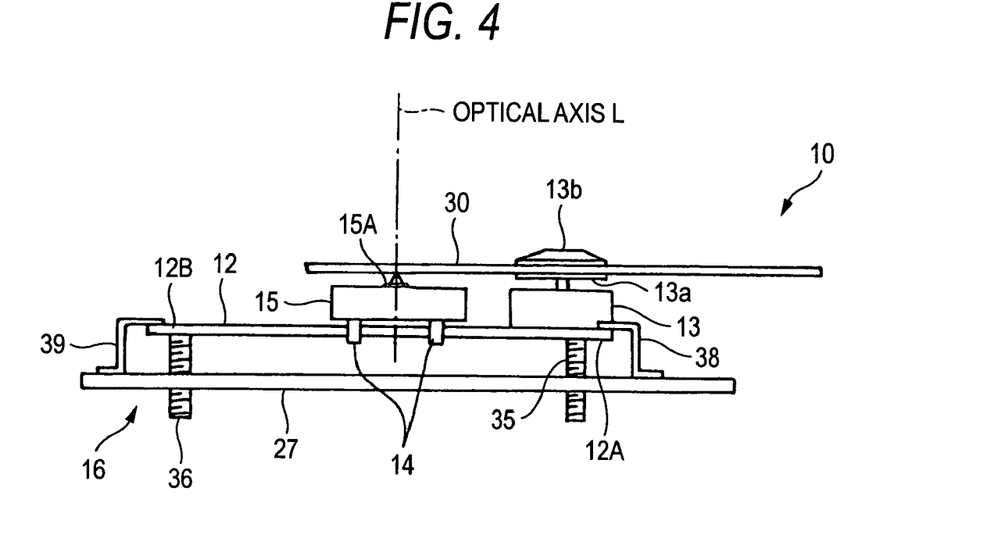
FIG. 4 is a view taken in the direction of arrow B in FIG. 1.
Figure 5:
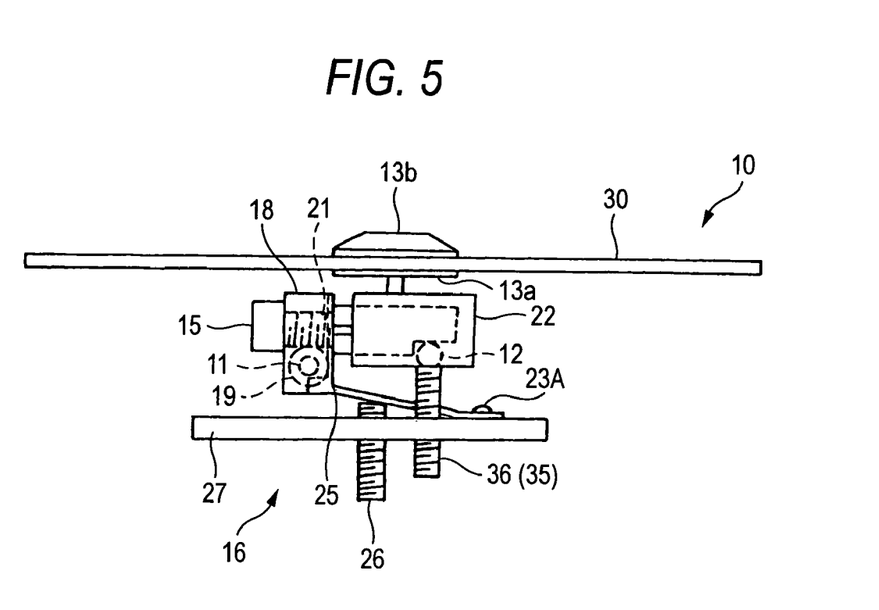
FIG. 5 is a view taken in the direction of arrow C in FIG. 3.

The skew adjusting mechanism 16 also includes: a first adjusting screw 26 for adjusting the feed screw 11; a second adjusting screw 35 for adjusting the guide shaft 12; and a third adjusting screw 36 for adjusting the guide shaft 12.

The support member 17 is arranged rising from a base plate 27 such as a chassis. An engaging recess portion not shown formed in an upper portion of the support member 17 is pivotally engaged with one end 11A of the feed screw 11. The support member 18 is attached to the elastic support member 25. An engaging recess portion not shown formed in a lower portion of the support member 18 is pivotally engaged with the other end 11B of the feed screw 11.

The elastic support member 38 is composed of a substantially S-shaped elastic member such as a leaf spring, and a lower end portion of the elastic support member 38 is attached to the base plate 27. An upper end portion of the elastic support member 38 comes into contact with an upper side of one end 12A of the guide shaft, so that one end 12A of the guide shaft is pushed downward.

The elastic support member 39 is composed of a substantially S-shaped elastic member such as a leaf spring, and a lower end portion of the elastic support member 39 is attached to the base plate 27. An upper end portion of the elastic support member 39 comes into contact with an upper side of the other end 12B of the guide shaft, so that the other end 12B of the guide shaft is pushed downward.

Both ends of the guide shaft 12 are respectively given an equal pushing force directed downward by the elastic support members 38, 39. In the case where no adjustments are made by the second adjusting screw 35 and the third adjusting screw 36, the guide shaft 12 can be maintained in parallel with the base plate 27 by the equal pushing force.

As shown in FIG. 3, the elastic support member 25 is composed of an elastic member such as a leaf spring formed into a substantial L-shape. The elastic support member 25 includes a flat plate member 25A arranged in parallel with the base plate 27; and a rising member 25B rising from the end portion of the flat plate member 25A.

The drive motor 22 is fixed onto the side of the rising member 25B on the flat plate 25A side by screws not shown. A rotary shaft of the drive motor 22 is inserted into a through-hole 25C formed on the side.

On the side end portion of the rising member 25B, there is provided a substantially C-shaped attaching member 24 that extends in the direction opposite to the direction in which the flat plate member 25A is extending. The support member 18 is attached to the attaching member 24 by screws 23.

The flat plate member 25A is arranged on the base plate 27 in parallel with each other. An end portion of the flat plate member 25A on the side opposite to the rising member 25B is attached to the base plate 27 by the screw 23A shown in FIG. 5.

An upper end of the first adjusting screw 26 comes into contact with a portion of the lower face of the flat plate member 25A close to the rising member 25B.

The first adjusting screw. 26 is screwed to the base plate 27. The upper end of the first adjusting screw 26 comes into contact with the elastic support member 25. When the first adjusting screw 26 is moved upward by a jig, the flat plate member 25A of the elastic-support member 25 is elastically deformed round a connecting point of the flat plate member 25A with the base plate 27 as shown in FIG. 5. Therefore, the support member 18 supported by the elastic support member 25 is moved upward.

This elastic support member 25 pushes the first adjusting screw 26 downward. When the first adjusting screw 26 moves upward, the flat plate member 25A of the elastic support member 25 is given a force resisting the pushing force and elastically deformed.

When the support member 18 is moved by the first adjusting screw 26 via the elastic support member 25, the other end 11B of the feed screw 11 supported by the support member 18 is moved and adjusted upward and downward.

As shown in FIG. 4, the second adjusting screw 35 is screwed to the base plate 27. An upper end of the second adjusting screw 35 comes into contact with the lower side of a portion of the guide shaft 12 close to one end 12A. When the second adjusting screw 35 is moved upward and downward by a jig, one end 12A of the guide shaft 12 is moved and adjusted upward and downward.

The third adjusting screw 36 is screwed to the base plate 27. An upper end of the third adjusting screw 36 comes into contact with the lower side of a portion of the guide shaft 12 close to the other end 12B. When the third adjusting screw 36 is moved upward and downward by a jig, the other end 12B of the guide shaft 12 is moved and adjusted upward and downward.

When the first adjusting screw 26, the second 35 adjusting screw and the third adjusting screw 36 are respectively set at a predetermined height, the optical pickup 15 movably attached to the feed screw 11 and the guide shaft 12 is maintained in a horizontal state.

The predetermined height is set at the most appropriate value according to the design of products. In the embodiment, height from the base plate 27 to the feed screw 11 is set at 1 mm, and also height from the base plate 27 to the guide shaft 12 is set at 1 mm.

The predetermined height is set by a position of the engaging recess formed in the support member 17. That is, when the first 26, the second 35 and the third adjusting screw 36 are respectively set at a predetermined height, the optical pickup 15 is set in a horizontal state.

FIGS. 2, 4 and 5 show a state in which the optical pickup 15 is maintained horizontal. As can be seen in these drawings, the first adjusting screw 26, the second adjusting screw 35 and the third adjusting screw 36 are respectively set at a predetermined height from the base plate 27.

A skew of the optical pickup 15 is adjusted by the first adjusting screw 26, the second adjusting screw 35 and the third adjusting screw 36. The optical axis L of the objective lens 15A is adjusted in the radial direction by the first adjusting member 26 and the third adjusting member 36, and the optical axis L (shown in FIG. 2) of the objective lens 15A is adjusted in the tangential direction by the second adjusting member 35 and the third adjusting member 36.

Figure 6A:
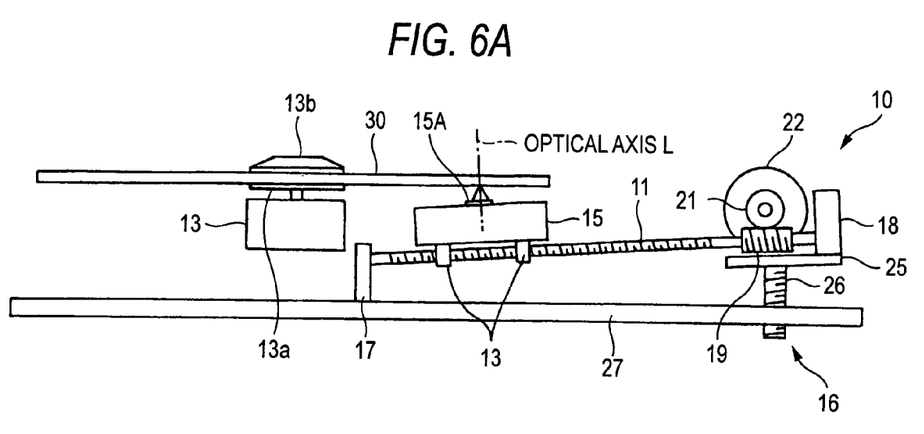
FIGS. 6A and 6B are schematic illustrations showing an example of operation in which a feed screw is operated by the skew adjusting mechanism.
Figure 6B:
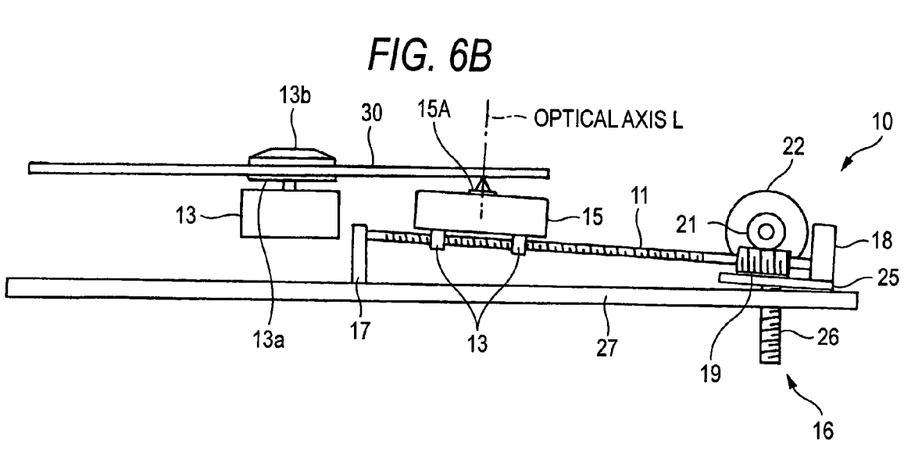
Figure 7A:
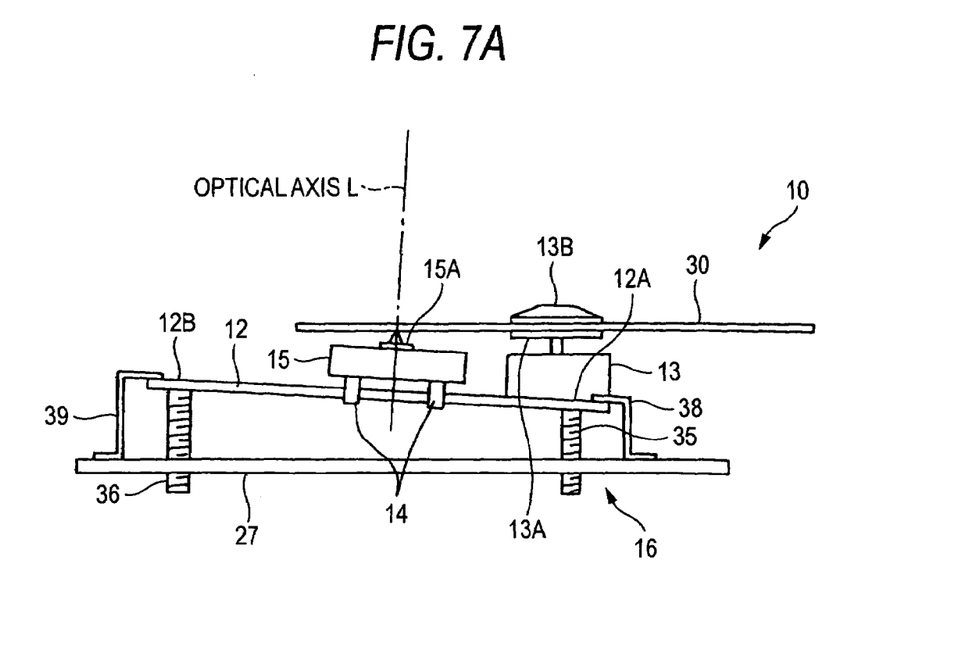
FIGS. 7A and 7B are schematic illustrations showing an example of operation in which a guide shaft is operated by the skew adjusting mechanism.
Figure 7B:
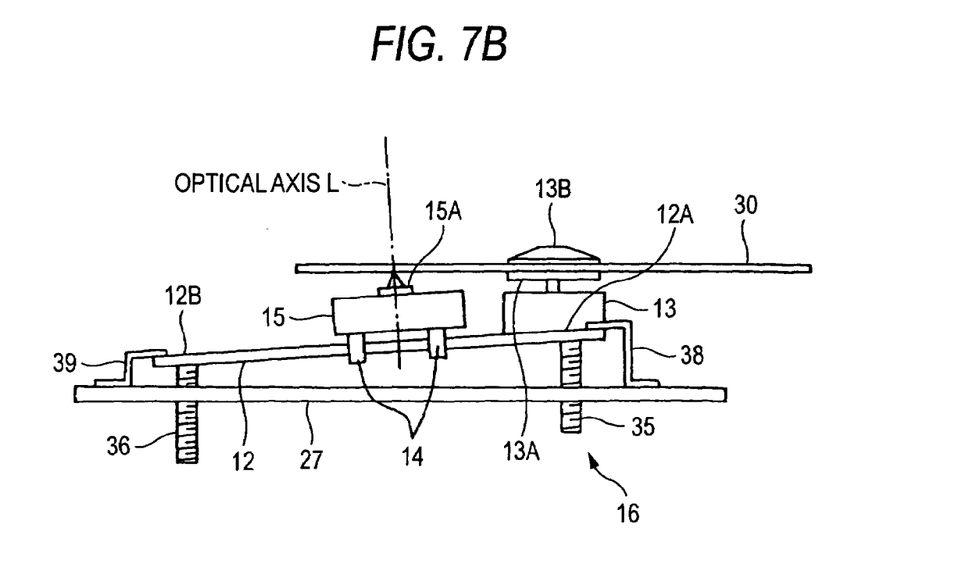
Figure 8A:
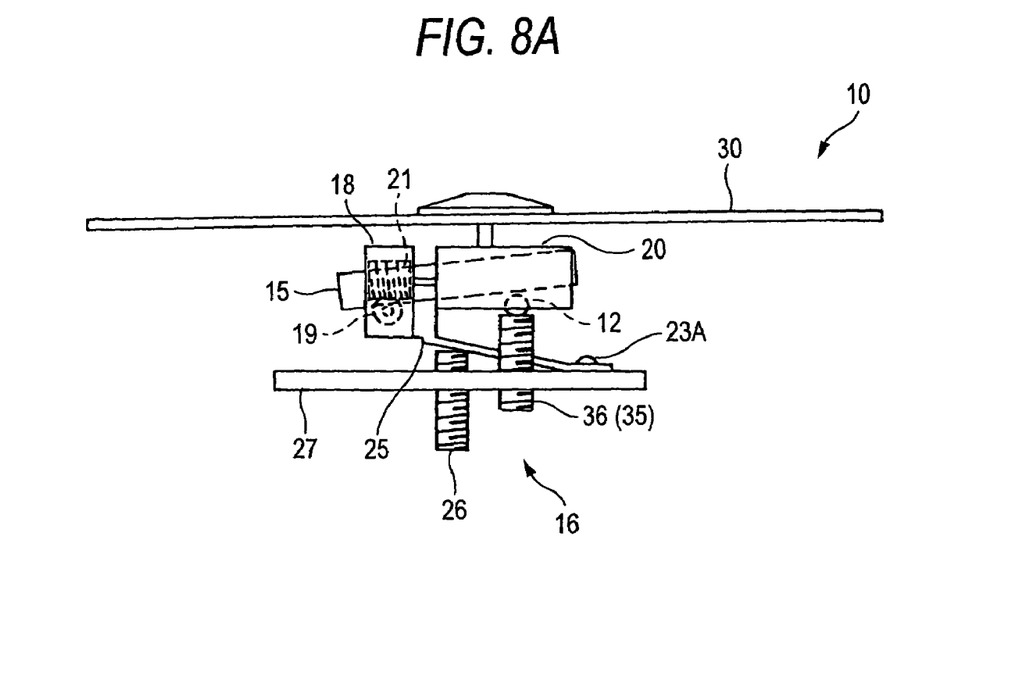
FIGS. 8A and 8B are schematic illustrations showing an action of a second and a third adjusting screw of the skew adjusting mechanism.
Figure 8B:
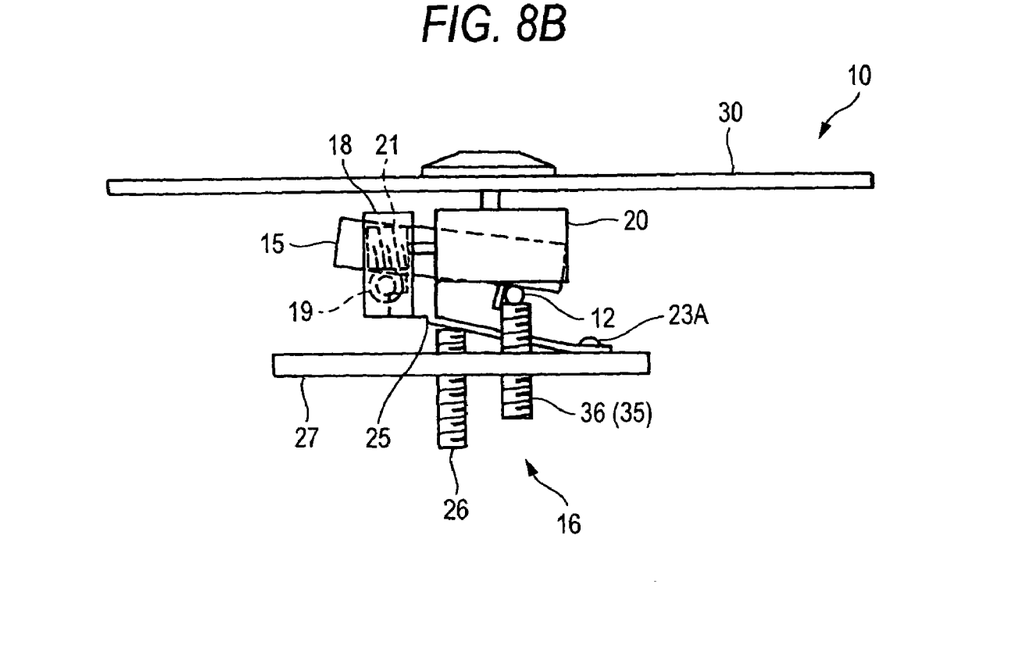

Referring now to FIGS. 6 through 8, operation of the skew adjusting mechanism 16 will be explained below. Hereinbelow, explanations will be made into the adjustment of the objective lens 15A in the radial direction of optical axis L made by the first 26 and the third adjusting screw 36.

In the state in which the first adjusting screw 26 and the third adjusting screw 36 are respectively set at a predetermined height, that is, in the state in which the optical pickup 15 is set horizontal as shown in FIGS. 4 and 5, the first adjusting screw 26 and the third adjusting screw 36 are respectively turned clockwise with a jig. Due to the foregoing, as shown in FIGS. 6A and 7A, the first adjusting screw 26 and the third adjusting screw 36 are raised from the base plate 27.

Then, the feed screw 11 and the guide shaft 12 are respectively inclined by an arbitrary upward grade round the engaging recess of each support member 17 and round the contact point of the second adjusting screw 35.

The first adjusting screw 26 and the third adjusting screw 36 need to be raised synchronously with each other. For example, the support member 17 and the second adjusting screw 35 are arranged in parallel with each other in a direction perpendicular to the moving direction of the optical pickup 15, and further the first adjusting screw 26 and the third adjusting screw 36 are arranged in parallel with each other in a direction perpendicular to the moving direction of the optical pickup 15. Under the condition that the diameter and screw pitch of the first adjusting screw 26 are made to be equal to those of the third adjusting screw 36, the first adjusting screw 26 is turned clockwise by one turn, and then the third adjusting screw 36 is turned clockwise by one turn. In this way, the first adjusting screw 26 and the third adjusting screw 36 are alternatively turned by one turn. In this way, the adjusting screws can be raised by the same height each time the turning operation is conducted as described above.

Therefore, the feed screw 11 and the guide shaft 12 are always inclined by the same angle each time the turning operation is conducted. Therefore, the skew of the optical pickup 15 can be stably adjusted. The first adjusting screw 26 and the third adjusting screw 36 are pushed downward by the elastic support members 25 and 39, and the pushing forces act as a trigger when the first adjusting screw 26 and the third adjusting screw 36 are raised, so that the adjusting screws can be prevented from being raised too high.

Next, in the state in which the first adjusting screw 26 and the third adjusting screw 36 are respectively positioned at a predetermined height, that is, in the state shown in FIGS. 2, 4 and 5 in which the optical pickup 15 is set horizontal, the first adjusting screw 26 and the third adjusting screw 36 are respectively turned counterclockwise by a jig. As shown in FIGS. 6B and 7B, the first adjusting screw 26 and the third adjusting screw 36 are lowered with respect to the base plate 27.

The feed screw 11 and the guide shaft 12 can be respectively inclined by an arbitrary downward grade round the engaging recess of each support member 17 and round the contact point with the second adjusting screw 35. In this case, the first adjusting screw 26 and the third adjusting screw 36 need to be lowered synchronously with each other.

In the same manner as that of raising the adjusting screw, for example, under the condition that the diameter and screw pitch of the first adjusting screw 26 are made to be equal to those of the third adjusting screw 36, the first adjusting screw 26 is turned counterclockwise by one turn, and then the third adjusting screw 36 is turned counterclockwise by one turn. In this way, the first adjusting screw 26 and the third adjusting screw 36 are alternatively turned by one turn.

In the above way, the adjusting screws can be lowered by the same height each time the turning operation is conducted. Therefore, the feed screw 11 and the guide shaft 12 are always inclined by the same angle each time the turning operation is conducted. Therefore, the skew of the optical pickup 15 can be stably adjusted.

When the feed screw 11 and the guide shaft 12 are respectively moved and adjusted in the above way, a skew of optical axis L of the objective lens 15A in the radial direction can be adjusted, and an angle formed between the optical axis L and the information recording face can be adjusted.

Hereinafter, explanations will be made into the adjustment of the objective lens 15A in the tangential direction of the optical axis L made by the second adjusting screw 35 and the third adjusting screw 36.

Figure 9A:
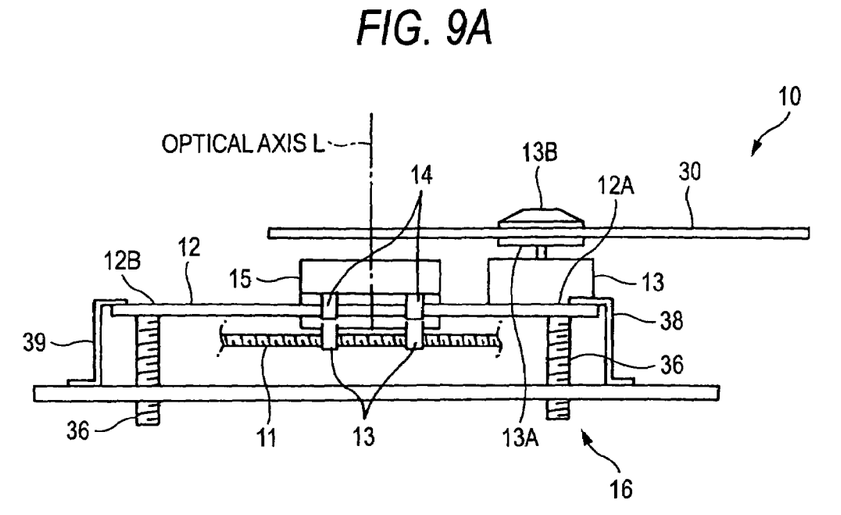
FIGS. 9A and 9B are schematic illustrations showing an action of the second and the third adjusting screw of the skew adjusting mechanism.

In the state in which the second adjusting screw 35 and the third adjusting screw 36 are respectively set at a predetermined height, that is, in the state in which the optical pickup 15 is set horizontal as shown in FIGS. 2, 4 and 5, the second adjusting screw 35 and the third adjusting screw 36 are respectively turned clockwise by a jig. Due to the foregoing, as shown in FIGS. 8A and 9A, the second adjusting screw 35 and the third adjusting screw 36 are raised from the base plate 27.

The guide shaft 12 can be raised to an arbitrary height round the feed screw 11. In this case, the second adjusting screw 35 and the third adjusting screw 36 must be raised synchronously with each other.

For example, under the condition that the diameter and screw pitch of the second adjusting screw 35 are made to be equal to those of the third adjusting screw 36, the second adjusting screw 35 is turned clockwise by one turn, and then the third adjusting screw 36 is turned clockwise by one turn. In this way, the second adjusting screw 35 and the third adjusting screw-36 are alternatively turned by one turn.

In the above way, the adjusting screws can be raised by the same height each time the turning operation is conducted. Therefore, while the guide shaft 12 is being maintained to be parallel with the feed screw 11, the guide shaft 12 is raised, and a skew of the optical pickup 15 can be stably adjusted.

Since the second adjusting screw 35 and the third adjusting screw 36 are respectively pushed downward by the elastic support members 38 and 39, the pushing forces act as a trigger when the second adjusting screw 35 and the third adjusting screw 36 are raised, so that the adjusting screws can be prevented from being raised too high.

Figure 9B:
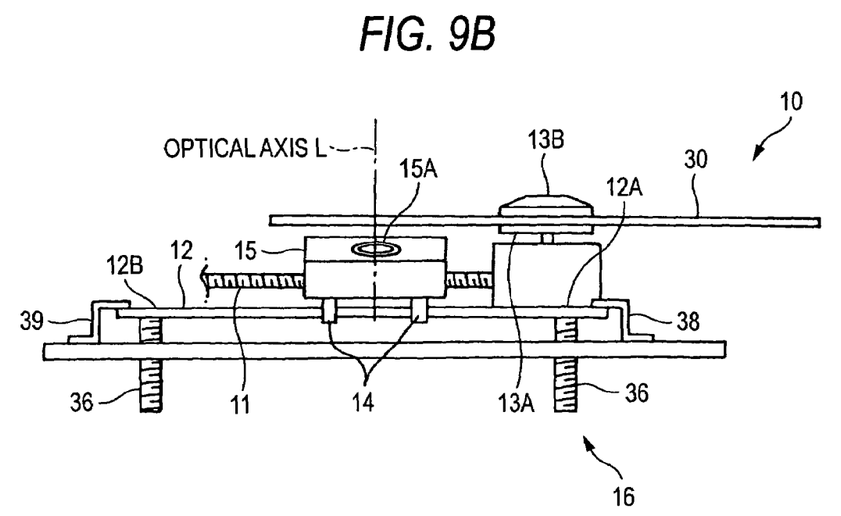

In the state in which the second adjusting screw 35 and the third adjusting screw 36 are respectively positioned at a predetermined height, that is, in the state shown in FIGS. 2, 4 and 5 in which the optical pickup 15 is set horizontal, the second adjusting screw 35 and the third adjusting screw 36 are respectively turned counterclockwise by a jig. As shown in FIGS. 8B, 9B, the second adjusting screw 35 and the third adjusting screw 36 are lowered with respect to the base plate 27.

The guide shaft 12 can be lowered to an arbitrary height round the feed screw 11. In this case, the second adjusting screw 35 and the third adjusting screw 36 need to be raised synchronously with each other.

In the above case, in the same manner as that described above, for example, under the condition that the diameter and screw pitch of the second adjusting screw 35 are made to be equal to those of the third adjusting screw 36, the second adjusting screw 35 is turned counterclockwise by one turn, and then the third adjusting screw 36 is turned counterclockwise by one turn. In this way, the second adjusting screw 35 and the third adjusting screw 36 are alternatively turned by one turn.

In the embodiment, each adjusting screw can be lowered by the same height each time the turning operation is conducted. Therefore, while the guide shaft 12 is being maintained to be parallel with the feed screw 11, the guide shaft 12 is lowered, and a skew of the optical pickup 15 can be stably adjusted.

In the embodiment, when the guide shaft 12 is moved and adjusted, a skew of the optical axis L of the objective lens 15A in the tangential direction can be adjusted, and an angle formed between the optical axis L and the information recording face can be adjusted.

As described in detail above, in the skew adjusting mechanism 16 of an optical pickup of the embodiment, both the feed screw 11 and the guide shaft 12 can be moved to be adjusted. When the feed screw 11 and the guide shaft 12 are moved to be adjusted, the skew of the optical pickup can be adjusted.

Accordingly, there is no possibility that a minute discrepancy of the parallelism of the feed screw 11 with the guide shaft 12 is caused.

Accordingly, even after the skew of the optical pickup has been adjusted, it is possible to stably move the optical pickup 15 without giving an unnecessary load to the feed screw 11 or the drive motor 22. Since the drive motor 22 is also moved in the case of moving and adjusting the feed screw 11, there is no possibility that a positional discrepancy is caused between the gear 19 to be driven of the feed screw 11 and the drive gear 21 arranged on the rotary shaft of the drive motor 22. Therefore, adjustments can be carried out while the positional relations are appropriately maintained.

A number of the feed screw 11 and that of the guide shaft 12 arranged in the optical pickup moving mechanism 10 are respectively determined to be one. Therefore, the number of parts can be reduced, and the feed screw 11 and the guide shaft 12 can be easily moved and adjusted.

The feed screw 11 and the guide shaft 12 provided in the optical pickup moving mechanism 10 are arranged on the lower side of the optical pickup 15. Therefore, the size can be reduced, and those components can be easily moved and adjusted.

In the embodiment, explanations are made into a case in which the skew adjusting mechanism 16 of an optical pickup is applied to a playback machine for playing back a recording medium such as DVD. However, the present invention is not limited to the above specific embodiment. For example, the skew adjusting mechanism 16 of the optical pickup 15 can be applied to a playback machine for playing back a recording medium such as CD.

It should be noted that the present invention is not limited to the above specific embodiment, and variations may be made without departing from the scope of the present invention. As long as the present invention can be accomplished, the material, profile, size, form, number, arrangement position and thickness of the feed screw, guide shaft, optical pickup and recording medium, which are exemplarily shown in the above embodiment, can be arbitrarily determined, that is, they are not limited to the specific embodiment.

As explained above, according to one aspect of the invention, both the feed screw and the guide shaft can be moved. When they are moved and adjusted, a skew of the optical pickup can be adjusted.

Accordingly, there is no possibility that a minute misalignment is caused in the parallelism of the feed screw with the guide shaft after the skew of the optical pickup has been adjusted.

Therefore, even after the skew of the optical pickup has been adjusted, the optical pickup can be stably moved without giving an excessively heavy load to the feed screw and the drive motor.

Further, when the drive motor is moved in the case of moving and adjusting the feed screw, it is possible to prevent the occurrence of a discrepancy of the position between the gear to be driven of the feed screw 11 and the drive gear arranged on the rotary shaft of the drive motor.

According to another aspect of the invention, the optical pickup moving mechanism is provided with one feed screw and one guide shaft. Therefore, the number of parts can be reduced, and the feed screw and the guide shaft can be easily moved and adjusted.

According to another aspect of the invention, since the feed screw and the guide shaft of the optical pickup moving mechanism are arranged on the lower side of the optical pickup, it becomes possible to reduce the size. Further, the feed screw and the guide shaft can be easily moved and adjusted.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. An optical pickup apparatus comprising:
    an optical pickup adapted to irradiate a light on an information recording face of a recording medium and to read out information recorded on the information recording face;
    a feed screw adapted to move the optical pickup in a radial direction of the recording medium;
    a guide shaft arranged to be in parallel with the feed screw and adapted to support and guide a movement of the optical pickup;
    a first support member adapted to support a first end portion of the feed screw located on an inner circumferential side of the information recording face;
    a second support member adapted to support a second end portion of the feed screw located on an outer circumferential side of the information recording face;
    a first elastic support member adapted to support a first end portion of the guide shaft located on the inner circumferential side of the information recording face;
    a second elastic support member adapted to support a second end portion of the guide shaft located on a outer circumferential side of the information recording face;
    a drive motor adapted to drive the feed screw so as to move the optical pickup along the guide shaft;
    a third elastic support member adapted to support the second support member and the drive motor;
    a base plate on which the first support member, the first elastic support member, and an end portion of the third elastic support member are fixed; and
    a skew adjusting mechanism adapted to move each of the third elastic member and both ends of the feed screw to adjust a skew of the optical pickup with respect to the information recording face of the recording medium.

2. The optical pickup apparatus as claimed in claim 1, including one of each of the guide shaft and the feed screw.

3. The optical pickup apparatus as claimed in claim 1, wherein the feed screw and the guide shaft are respectively arranged on a lower side of the optical pickup.

4. The optical pickup apparatus as claimed in claim 1, wherein the skew adjusting mechanism further comprises:
    a first adjusting screw adapted to move the third elastic support member in direction perpendicular to the information recording face;
    a second adjusting screw adapted to move the first end portion of the guide shaft in direction perpendicular to the information recording face; and
    a third adjusting screw adapted to move the second end portion of the guide shaft in direction perpendicular to the information recording face.

* * * * *